Aug. 11, 1959  R. HASTINGS, JR  2,898,872
LATCH LINKAGE MEANS

Filed May 7, 1956  2 Sheets-Sheet 1

INVENTOR.
RUSSELL HASTINGS, JR.
BY
ATTY.

Aug. 11, 1959 R. HASTINGS, JR 2,898,872
LATCH LINKAGE MEANS
Filed May 7, 1956 2 Sheets-Sheet 2

INVENTOR.
RUSSELL HASTINGS, JR.
BY
ATTY.

United States Patent Office 2,898,872
Patented Aug. 11, 1959

2,898,872

LATCH LINKAGE MEANS

Russell Hastings, Jr., Battle Creek, Mich., assignor to Clark Equipment Company, a corporation of Michigan Application May 7, 1956, Serial No. 583,232

4 Claims. (Cl. 105—366)

My invention relates generally to handling and transporting of freight and more particularly concerns an improved latching means for effectively associating and disassociating suitable portable freight carrier means with freight transporting means, such as railway cars, truck trailers, airplanes, ships and like conveyances.

The general features of the material handling system to which the present invention pertains are set forth more fully in a prior filed application, now abandoned, Serial No. 531,489, filed on August 30, 1955, in the name of Jack E. Loomis and entitled "Freight Handling Means and Method." Generally, it may be stated that the linkage means of my present invention is related to a portable freight carrier means capable of being handled by known material handling equipment, such as fork lift trucks, straddle trucks, cranes and other mechanical devices of a similar nature. Normally, such freight carrier means comprise a single enclosed container of suitable dimensions which may be likened to the body of a truck trailer, an open frame-work structure for supporting parts or a complete or partial assembly of parts such as automobile bodies or complete automobiles, an open gondola which forms a container for carrying coal or like granular products, or a tank-like construction for carrying fluid materials. The particulars of such freight carrier means and their employment with freight transporting means such as cross country trailer trucks, ships, airplanes, or railway flat cars and are to be found in greater detail in the above referred to patent application. It is the basic intention of the therein outlined material handling system to associate a portable or movable freight carrier means with a suitable transporting means bearing a freight supporting surface which is equipped with a permanently projecting or retractable anchor means. The system is further designed so that the positioning of the material handling equipment adjacent the freight carrier means at a location or condition suitable for lifting the same, serves to operate an organized latching system which is employed to secure the freight carrier means to the anchor means of the freight transporting means. The particular latch linking means of this invention forms one example of such an organized latching system.

Broadly stated, the latch linkage means of this invention includes a system of cranks and levers and a tripping means related thereto for axially motivating sets of locking pins which engage with anchor means of the freight transporting vehicle. The linkage is further designed and intended for employment with industrial lift truck or straddle trucks which are capable of automatically motivating the linkage system to place the locking pins thereof in a retracted or non-engaging condition. To the latter end, a novel latch tripping means is provided which is activated by merely positioning the material handling device ready for lifting the freight carrier means. When using fork lift trucks, such latch activating position occurs substantially before the lift forks are inserted fully beneath the carrier means.

The main object of this invention is to provide a new and improved linkage mechanism for use with portable freight carrier means which is operable by industrial material handling devices.

Another object of this invention is to provide a new and improved latch mechanism and linkage means for a portable freight carrier means which is automatically operable by the positioning of an industrial handling device for lifting said freight carrier means.

A further object of this invention is to provide a latching means in association with a portable freight-carrier means for effecting automatic unlatching of the freight carrier means from an anchor means of a freight transporting means by positioning a material handling device proximate the freight carrier means preparatory to lifting the same.

A still further object of this invention is to provide a new and improved latch means for use with a portable freight carrier means which is capable of connecting said freight carrier means to the supporting surface of a freight transporting means, such as a railway flat car, and which provides a means for visually checking the interlocked relation of the carrier and the transporting means.

The above and further objects, features and advantages of this invention will become apparent to those skilled in the art from the following detailed description and specifications for a preferred embodiment of its concepts as shown in the accompanying drawings:

Figure 1:
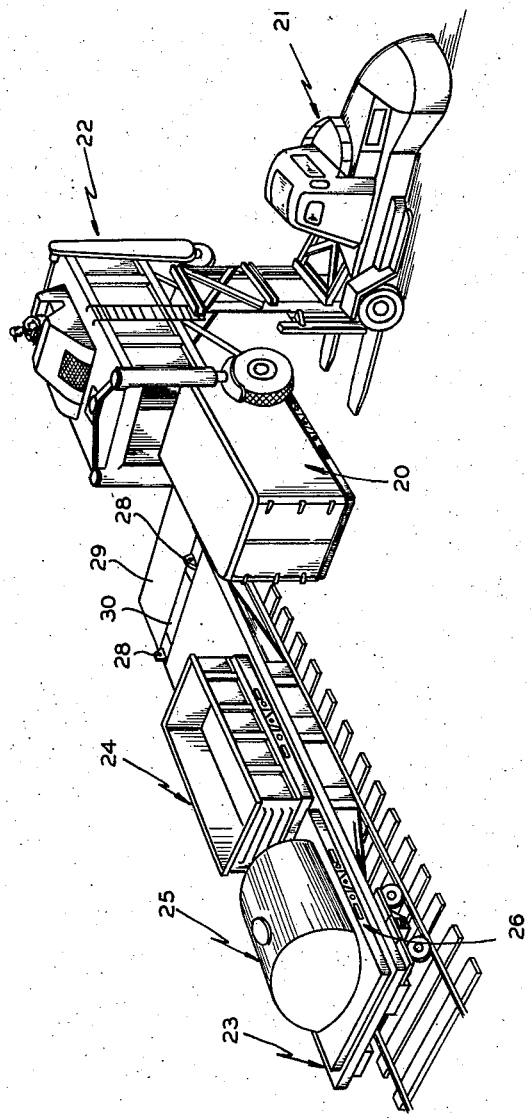
Figure 1 is a schematic representation of a freight handling and transporting system in which the present invention is useful.

The general features of the material handling system employing my present invention are schematically set forth in the perspective illustration of Figure 1. It will be observed from that figure that I have illustrated several forms of freight carrier means and material handling devices. For example, a box-like freight carrier means 20 is shown therein, comprising an enclosed container for engagement and transfer by either a lift truck material handling device 21 or a straddle truck material handling device 22. Such freight carrier means is arranged for transportation on board a supporting surface of a railroad flat car 23 or other suitable type of rail, wheel, water or air borne transporting means.

Also illustrated in Figure 1, in association with the railroad flat car 23, are two modified forms of box-like freight carrier containers or means, comprising an open top gondola style of carrier 24 especially suited for carrying loose material, such as coal, sand and the like and a tank type of freight carrier means 25 particularly designed for the transportation and storage of liquids.

While the particular form of the container portion of the freight carrier means 20, 24 and 25 may vary as described, common thereto is their base structure, indicated generally by numeral 26, which is formed as a substantially planar platform containing the latch and linkage means of my invention for associating and disassociating such freight carriers with respect to anchor plates or means 28 extending upwardly from the supporting surface 29 of the transporting means, such as flat car 23. At this point, it is well to understand that while the freight carrier means of Figure 1 are shown in association with a railway flat car, they likewise may be associated with any suitable supporting surface provided by other known freight transporting means.

While the particulars of the anchor mechanisms 28 employed are more fully set forth in the above referred to application, briefly, such substantially comprise plates of wedge-shaped cross section which extend upwardly from a metal plank member 30 disposed substantially transversely of the longitudinal axis of the freight transporting means, such as the railway flat car 23, and which form a portion of the supporting surface thereof. Note in this regard, that the individual anchor plates 28 are disposed in spaced parallelism adjacent the opposite edges of the supporting surface 29 so as to engage or embrace the base structure 26 of the freight carrier means therebetween. Normally, at least one set of anchor plates is provided for each freight carrier.

Having thus set forth the general arrangement and atmosphere in which the present invention is to be employed, the particulars of my improved linkage or latching arrangement will now be described. For purposes of more quickly understanding and grasping the concepts involved in my invention, reference is now made to Figures 2 and 3 of the drawings.

Figure 2:
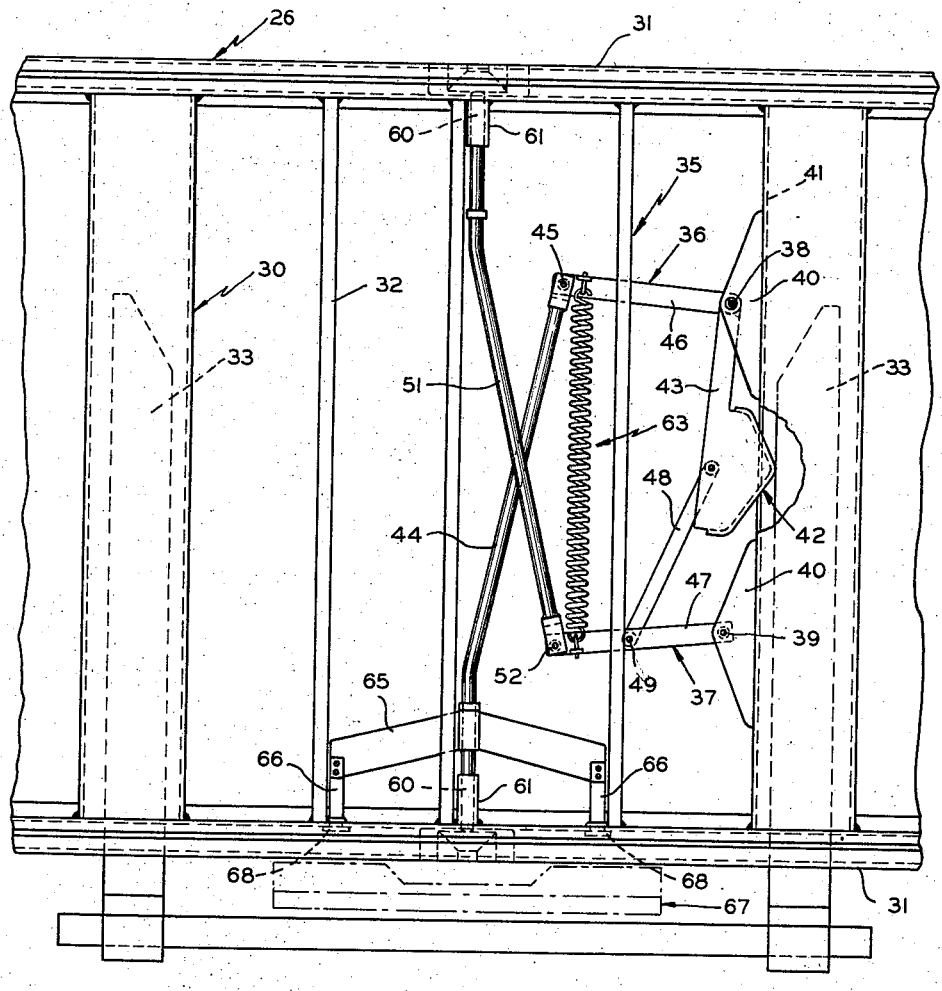
Figure 2 is an enlarged partial bottom plan view of a base for a typical freight carrier means in which my present invention finds utility and illustrating particularly the improved latching and linkage mechanism of this invention.
Figure 3:
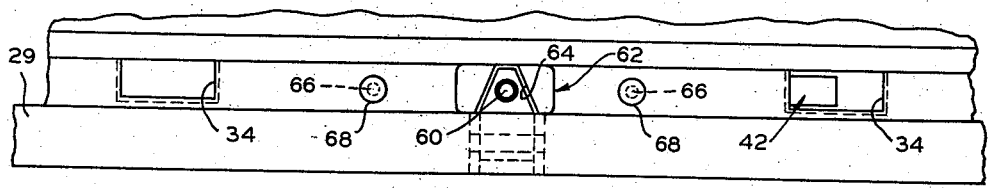
Figure 3 is a partial enlarged front elevational view of the base structure and latch and linkage mechanism illustrated in Figure 2.

It will be recalled that Figures 2 and 3 represent partial plan and front elevational views, respectively, of the base structure 26 employed in the several freight carrier means 20, 24 and 25 shown in Figure 1. Generally, it may be stated that the base structure for the freight carrier means includes a pair of parallel spaced box-like channel members 30—30 which extend transversely between parallel side rails 31—31 and parallel to supporting cross beams 32 of the base structure. Such box-like channel members provide elongated chambers designed specifically for the axial entry and reception of fork members 33 associated with an industrial lift type material handling device, such as lift truck 21 shown in Figure 1. To accommodate the entry of such fork members, the channel members 30—30 are open ended thus affording access through the side rails 31—31 of the freight carrier base structure, as shown at 34 in Figure 3 of the drawings.

My improved latching mechanism indicated generally by numeral 35 in Figure 2, is designed to respond to the insertion of the fork members 33 within the channel members 30—30 so that the latching mechanism will be engaged and tripped to unlatch the carrier means from the anchor means 28—28 on the freight transporting means, substantially before the forks are fully inserted preparatory to lifting the carrier means.

In more specific detail, latching mechanism 35 includes a bell crank 36 and a pivotal link system 37 secured by pivot pins 38 and 39 to triangular-shaped support plate members 40—40; the latter being secured to a side wall 41 of one of the channel members 30 in a manner to extend toward the other channel member. A suitable opening (not shown) is formed in the said one side wall 41 for the passage of a trip bar or shoe 42 formed as a fixed extension of base arm 43 on bell crank lever 36. Thus, as the fork arms 33 move into the interior of the channel members 30 and approach its fully inserted position, one of the fork arms engages the trip bar 42, moving the bell crank linkage 36 responsively clockwise, as viewed in Figure 2, to longitudinally motivate a reach rod 44 which is pivotally joined by pin means 45 to the outer end of the secondary arm 46 of the bell crank 36.

The linkage means 37 also includes a first link means 47 and a second link 48 which are pivotally interjoined at approximately the midpoint of link 47 by pivot means 49. Link 48 is pivotally supported and secured at one end adjacent the outer end of arm 43 of the bell crank 36 as by pivot pin 50. Link 47 is pivotally secured at its inner end to one of the plates 40 by the pivot means 39. A free or outer end of link 47 is pivotally secured to one end of a second reach rod 51 as by pivot means 52. With this arrangement, it will be understood that engagement of trip member 42 by the one fork arm 33 causes clockwise motivation of the bell crank 36, as described, but reverse or counterclockwise movement of link means 37, thus motivating reach rods 44 and 51 in opposite axial directions.

Latching pin or plunger means 60—60 are joined and formed coaxially with the outer ends of rod means 44 and 51 and such two pins 60—60 are supported in sleeve bearings 61 carried by the side rails 31 to invade openings in a cast pad means or plate 62 (see Figure 3) which received an anchor plate 28.

It will be seen that a spring means 63 extends between the secondary arm member 46 and link arm 47 of the bell crank means 36 and link means 37, respectively, to oppose inward movement or withdrawal of the pin means 60—60. Consequently, the latching pins 60—60 are normally biased to a position where such project through the pad members 62. Engagement of the trip means 42 by the one fork arm 33, however, serves to activate the bell crank 36 and link means 37 as previously related to withdraw the pin means 60—60 axially toward one another against the force of spring 63 and thereby effect their disengagement from the anchor plate means 28—28 on the freight transporting means. Note that engagement between fork arm 33 and trip means 42 occurs as the former moves axially into the channel members, and substantially before such fork arm reaches a fully inserted position therein. This feature permits the truck to be stopped a substantial distance from the side of the freight transporting means and the freight carrier means, thus minimizing the possibility that the truck operation will attempt to lift the carrier means prior to unlocking the latching mechanism.

In regard to the formation of the cast pads 62, it will be noted that such include a substantially triangular indentation 64 which matingly receives the correspondingly shaped anchor plate means 28; such triangular indentation serving as a pilot means for guiding the freight carrier means onto the freight transporting means during the lowering operation effected by the particular material handling device moving the freight carrier means.

In certain instances, a straddle truck such as truck 22 of Figure 1 will be usefully employed to handle a freight carrier means, such as a carrier means 20. On such occasions, the straddle arms of the truck 22, which do not include members corresponding to the fork members 33—33 of the fork type lift truck, cannot serve to engage the tripping means 42. Therefore, a freight carrier means equipped only for operation by a fork lift truck would be unduly limited in its utility. To obviate this difficulty, it is recognized that auxiliary means for operating the latching mechanism 35 of my invention is needed to accommodate employment of straddle truck material handling devices. To accomplish this desirable objective, a bolster arm 65 is attached adjacent one of the latching pins 60 near the outer end of rod 44, as in the particular embodiment illustrated. Such bolster arm 65 reaches substantially transversely of the axis of pin 60 on rod 44 and projects outwardly of opposite sides thereof in symmetrical fashion to support at its ends a pair of trip pins 66—66. Pins 66 extend through the adjacent side frame rail 31 of the freight carrier's base structure sufficiently to be engaged by a straddle arm 67 of a straddle lift truck. The pins 66 are further equipped with engaging pads 68 at their outer ends for contacting such straddle arm 67. It will be noted from the embodiment illustrated that only one such bolster arm 65 and set of trip pins 66 are provided for each of my latching means, although obviously, a second set of latch pins and bolster arm means can be included on the opposite side of the base structure 20, if desired. As a result of this arrangement, when the straddle truck 22 is positioned over the load or freight carrier means, the pin means 66 are suitably engaged and depressed by the normal inward movement of the straddle arm 67 preparatory to gripping the load. Such depression of pin 66 serves to drive reach rod 44 axially inward thereby rotating bell crank means 36 clockwise and moving link means 47 counterclockwise to activate the latching mechanism of this invention and withdraw the latching pins 60 as desired.

It will also be appreciated that in all operating instances the outer ends of the latching pins 60 or the trip pins 66 are visible to the operator from outside the carrier. Therefore, a convenient means is provided to observe the latched condition of such pins after depositing the carrier means on the freight transporting means. In other words, since the latching operation relies on the spring force and the correct positioning of the freight carrier means, it is important as a final check that the driver be able to observe correct latching of the mechanism. A failure to latch would occur only as a result of a damaged latch mechanism or blocking of the mechanism in some manner to resist action of the springs.

From the foregoing description and illustration of the preferred embodiment of my present invention, it is believed that those familiar in the art will clearly understand and appreciate the workings and utility of the unique latching means described.

It should further be noted that the geometric arrangement of the latching mechanism between a pair of channel members which form or comprise pockets for the reception of forks of a lift truck leads to a compact and economical arrangement in the construction or conversion of present day transporting means to the concepts of the above outlined material handling system. It is also understandable that while the concepts of my invention have been related to a particular embodiment thereof, obviously numerous changes, modifications and substitutions of equivalents may be made therein without necessarily departing from the spirit and scope of the invention involved. As a consequence, it is not my intention to be limited to the particular form of the invention herein illustrated and described except as it may appear in the following appended claims.

I claim:

1. For use in securing a portable freight carrier to anchor members projecting upwardly from the supporting surface of a freight transporting device, the freight carrier having a base structure including parallel-spaced side rails each having a recess receptive of one of the anchor members, a latching mechanism comprising, bell crank means mounted in the base structure of the carrier for pivotal movement about a substantially vertical axis, a reach rod pivotally connected at one end to one arm of said bell crank means, a locking pin mounted on the other end of said reach rod and disposed opposite a recess in one of the carrier's side rails for movement through an opening therein, spring means having connection with said bell crank means for normally biasing the same appropriately to extend said locking pin outwardly through the said opening to lockingly engage an adjacent anchor member, and tripping means connected to said bell crank and engageable within the limits of the carrier's base structure for pivotally moving said bell crank in opposition to the biasing force of said spring means selectively to withdraw said locking pin from the anchor member engaged thereby.

2. A latching mechanism for use in locking a portable freight carrier to anchor members projecting upwardly from the supporting surface of a vehicle for transporting the carrier, the carrier having a base structure including recessed pads extending inwardly of opposite sides of the carrier and receptive of the anchor members, comprising, hollow channel members mounted within the base structure of the carrier and defining generally elongated chambers, said channel members extending transversely between the sides of the freight carrier with the chambers thereof being accessible from opposite sides of the carrier for the reception of the fork arms of an industrial lift truck, anchor pins slidingly mounted on the base of the carrier for movement through openings in the recessed pads, said pins being adapted to enter registering openings formed in the anchor members to couple the carrier to the transporting device, bell crank linkage means pivotally mounted on the base of the carrier and having connection with said pins, and trip means connected to said linkage means and extending into the elongated chamber of one of said hollow channel members for engagement by the fork arms of the industrial lift truck thrust thereinto preparatory to lifting the carrier, such engagement of trip means serving to move the same out of the chamber and pivot said linkage appropriately to withdraw said pins from said anchor members, thereby releasing the carrier.

3. In a freight transporting system of the type wherein a portable freight carrier is placed over anchor members projecting upwardly from the supporting surface of a freight transporting vehicle, is latched to said anchor members, transported to a point of destination, and thereafter removed from the transporting device, an improved latching mechanism mounted in a substantially rectangular base forming the bottom enclosure of the freight carrier for detachably connecting the carrier to the anchor members, comprising, recessed pad members mounted intermediate the ends of the carrier's base and on opposite sides thereof for receiving the projecting anchor members, said pad members having openings therethrough which register with corresponding openings in the anchor members when the carrier is properly aligned on the latter, locking pin members projecting through the openings in said pad members and supported for reciprocating movement, said pin members being adapted to project into the openings in the anchor members to lock the carrier to the transporting device, crank means pivotally mounted on the carrier's base structure for movement about generally vertical axes, pivotal link members interconnecting said crank means with said locking pin members whereby pivoting of said crank means produces axial movement of said pin members, spring means normally urging said crank means appropriately to extend the pin members into the openings of the anchor members, and trip means related with the crank means and engageable by material handling equipment positioned to lift the carrier from the transporting device, said trip means, when actuated, serving to pivot said crank against the biasing force of said spring means and retract said pin members from said anchor members.

4. A portable freight carrier adapted to be removably carried on a substantially horizontal surface of a freight transporting device, a pair of anchor pads mounted on opposite sides of said carrier to seat the latter on projecting anchor plates extending upwardly of the supporting surface on the transporting device, said anchor pads and anchor plates having registering openings when properly seated, a pair of pins mounted in the base of the carrier for axial reciprocation and adapted to move outwardly through the openings in the pads to enter openings in the said anchor plates thereby locking the carrier to the transporting device; reach rods connected to the said pins, bell crank means having connection with said reach rods and disposed intermediate said pins for pivotal movement about a generally vertical axis, a trip pad means at one end of said bell crank means and extending outwardly thereof, said trip pad means being engageable by the forks of an industrial lift truck inserted beneath the carrier for lifting the same, engagement of the trip means serving to pivot said bell crank to retract the locking pins from the anchor plates, and spring means normally urging said pins outwardly through the pads to enter the openings in the anchor plates.

References Cited in the file of this patent

UNITED STATES PATENTS 2,812,974    McHugh  _____ Nov. 12, 1957